(12) United States Patent
Horvitz et al.

(10) Patent No.: US 8,516,507 B2
(45) Date of Patent: Aug. 20, 2013

(54) PROVIDING ALTERNATIVE CONTENT IN A WINDOWED ENVIRONMENT

(75) Inventors: Eric J Horvitz, Kirkland, WA (US); David M Chickering, Bellevue, WA (US); Gary W Flake, Bellevue, WA (US); Lili Cheng, Bellevue, WA (US); Alexander G Gounares, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/542,961

(22) Filed: Jul. 6, 2012

(65) Prior Publication Data

US 2012/0268489 A1 Oct. 25, 2012

Related U.S. Application Data

(63) Continuation of application No. 13/361,451, filed on Jan. 30, 2012, now Pat. No. 8,239,885, which is a continuation of application No. 11/767,810, filed on Jun. 25, 2007, now Pat. No. 8,112,770.

(60) Provisional application No. 60/870,926, filed on Dec. 20, 2006.

(51) Int. Cl.
*G06F 13/00* (2006.01)

(52) U.S. Cl.
USPC .......................................... 719/328; 715/214

(58) Field of Classification Search
USPC .......................................... 719/328; 715/214
See application file for complete search history.

(56) References Cited

U.S. PATENT DOCUMENTS

| | | |
|---|---|---|
| 4,570,227 A | 2/1986 | Tachi et al. |
| 5,179,519 A | 1/1993 | Adachi et al. |
| 5,220,507 A | 6/1993 | Kirson |
| 5,608,635 A | 3/1997 | Tamai |
| 5,835,881 A | 11/1998 | Trovato et al. |
| 5,905,492 A | 5/1999 | Straub et al. |
| 5,911,773 A | 6/1999 | Mutsuga et al. |
| 6,061,695 A | 5/2000 | Slivka et al. |
| 6,078,865 A | 6/2000 | Koyanagi |
| 6,119,065 A | 9/2000 | Shimada et al. |
| 6,161,127 A | 12/2000 | Cezar et al. |

(Continued)

FOREIGN PATENT DOCUMENTS

JP 2004280510 10/2004

OTHER PUBLICATIONS

OA, for U.S. Appl. No. 11/767,810, mailed Aug. 15, 2011, 8 pages.

(Continued)

*Primary Examiner* — Andy Ho
(74) *Attorney, Agent, or Firm* — Shook, Hardy & Bacon L.L.P.

(57) ABSTRACT

Embodiments of the invention relate to an architecture or extension to a window manager. In particular, the extension can provide for a window rotation feature that can be exposed as a rotate button. Additionally or alternatively, the rotation feature can be activated based upon a diverse set of conditions, events, and/or commands. Upon activation of the rotation feature, the window manager can rotate a window about an axis to expose a secondary surface that can be populated with alternative content that is distinct from the content of the primary surface of the window. In addition, the architecture provides techniques for identifying both double-sided graphical objects and potentially double-sided objects.

19 Claims, 14 Drawing Sheets

(56) References Cited

U.S. PATENT DOCUMENTS

| | | |
|---|---|---|
| 6,262,726 B1 | 7/2001 | Stedman et al. |
| 6,298,304 B1 | 10/2001 | Theimer |
| 6,339,746 B1 | 1/2002 | Sugiyama et al. |
| 6,477,460 B2 | 11/2002 | Kepler |
| 6,526,350 B2 | 2/2003 | Sekiyama |
| 6,622,089 B2 | 9/2003 | Hasegawa et al. |
| 6,694,252 B2 | 2/2004 | Ukita |
| 6,728,635 B2 | 4/2004 | Hamada et al. |
| 6,748,225 B1 | 6/2004 | Kepler |
| 6,760,048 B1 | 7/2004 | Bates et al. |
| 6,822,662 B1 | 11/2004 | Cook et al. |
| 6,898,518 B2 | 5/2005 | Padmanabhan |
| 6,952,647 B2 | 10/2005 | Hasegawa et al. |
| 7,103,473 B2 | 9/2006 | Ranjan |
| 7,827,527 B1 | 11/2010 | Chiluvuri |
| 2001/0007968 A1 | 7/2001 | Shimazu |
| 2001/0025223 A1 | 9/2001 | Geiger et al. |
| 2001/0029527 A1 | 10/2001 | Goshen |
| 2001/0047272 A1 | 11/2001 | Frietas et al. |
| 2002/0032608 A1 | 3/2002 | Kanter |
| 2002/0164998 A1 | 11/2002 | Younis |
| 2002/0173905 A1 | 11/2002 | Jin et al. |
| 2002/0184095 A1 | 12/2002 | Scullard et al. |
| 2003/0079176 A1 | 4/2003 | Kang et al. |
| 2003/0182052 A1 | 9/2003 | DeLorme et al. |
| 2003/0200542 A1 | 10/2003 | Shaughnessy et al. |
| 2004/0059632 A1 | 3/2004 | Kang et al. |
| 2004/0204988 A1 | 10/2004 | Willers et al. |
| 2005/0021656 A1 | 1/2005 | Callegari |
| 2006/0031062 A1 | 2/2006 | Bakis et al. |
| 2006/0212220 A1 | 9/2006 | Bou-Channam et al. |
| 2006/0229941 A1 | 10/2006 | Gupta |
| 2006/0271277 A1 | 11/2006 | Hu et al. |
| 2007/0192168 A1 | 8/2007 | Van Luchene |
| 2008/0104103 A1 | 5/2008 | Adams |
| 2008/0108437 A1 | 5/2008 | Kaarela et al. |
| 2008/0207306 A1 | 8/2008 | Higbie |

OTHER PUBLICATIONS

OA for U.S. Appl. No. 11/767,741, mailed Jan. 21, 2010, 28 pages.
OA for U.S. Appl. No. 11/676,741, mailed Jul. 7, 2010, 19 pages.

PROVIDING ALTERNATIVE CONTENT IN A WINDOWED ENVIRONMENT

CROSS-REFERENCE TO RELATED APPLICATIONS

This application is a continuation of U.S. patent application Ser. No. 13/361,451, filed Jan. 30, 2012, entitled "PROVIDING ALTERNATIVE CONTENT IN A WINDOWED ENVIRONMENT," which is a continuation of U.S. patent application Ser. No. 11/767,810, filed Jun. 25, 2007, now issued as U.S. Pat. No. 8,112,770, entitled "PROVIDING ALTERNATIVE CONTENT IN A WINDOWED ENVIRONMENT" and claims the benefit of U.S. Provisional Patent Application Ser. No. 60/870,926, filed Dec. 20, 2006, entitled "ARCHITECTURES FOR SEARCH AND ADVERTISING." The disclosures of each of these applications is hereby incorporated herein in their entirety by reference.

BACKGROUND

Conventionally, in a windowed-based environment such as a computer-oriented desktop environment, windows and other graphical objects that constitute portions of a user interface are substantially treated as single-sided, two-dimensional objects. Some windows are expressly designed to appear like real-world objects, yet these virtual representations commonly lack certain features that are present in the real-world objects. For instance, some windows are expressly configured to appear as physical paper, a physical note card, a physical poster board, etc., yet irrespective of the computer-based features added to the window, the window still lacks some of the features of a physical piece of paper.

While window managers associated with, say, an operating system, typically employ numerous bells and whistles to "dress up" windows and provide numerous convenient options or features, such conventional efforts still lack one of the properties of a physical object. In particular, windows and many other two-dimensional graphical user interface objects are thought of as single-sided objects. In contrast, even a common, thin sheet of paper may be thought of as a two-dimensional object, yet a user of the paper inherently understands that the sheet of paper is double-sided, which is a notion that is not inherent in desktop computing environments.

Moreover, while certain applications, such as a solitaire card game, for instance, treat cards as double-sided objects, this aspect is implemented by the application and is not associated with a window manager feature. Accordingly, this aspect only applies in the context of the application.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an extension to a computer-implemented window manger for constructing double-sided objects out of tradition single-sided windows or other graphical objects in a manner that can be applied beyond the context of a single application. In accordance with one aspect of the claimed subject matter, the window manager can be extended to include a rotation feature that can rotate a window substantially 180 degrees about an x- or y-axis in order to expose a secondary surface. The rotation feature can be implemented as a rotate button to be displayed and/or accessible by various window types. The rotate button can signal the window manager to rotate a particular window, yet it is to be appreciated that the window manager can rotate the window based upon other criteria as well.

In accordance with another aspect of the claimed subject matter, the secondary surface can be populated with alternative content that can include advertisements, rewards, incentives, coupons, games or puzzles, additional content associated with the original content of the window, different formats or visualizations of the original content of the window, and so forth. In addition, the alternative content can be selected based upon a wide variety of criteria including but not limited to window size/position, demographics, interaction histories, a bidding model, original window contents, preferences, and so on.

According to another aspect of the claimed subject matter, an architecture can be provided for detecting windows that are double-sided such as playing cards in a card game application as well as potentially double-sided windows such as conventional windows, icons, menus, tabs, etc. For potentially double-sided windows the architecture can select alternative content as well as appropriate times to display the alternative content by rotating the window to expose the secondary surface. For graphical objects detected to already be double-sided objects, the architecture can determine or infer whether one of the sides includes content that is non-essential (e.g., the pattern side of a playing card), and overlay that side with the alternative content.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DESCRIPTION OF THE DRAWINGS

Illustrative embodiments of the invention are described in detail below with reference to the attached drawing figures, and wherein.

DETAILED DESCRIPTION

Figure 1:
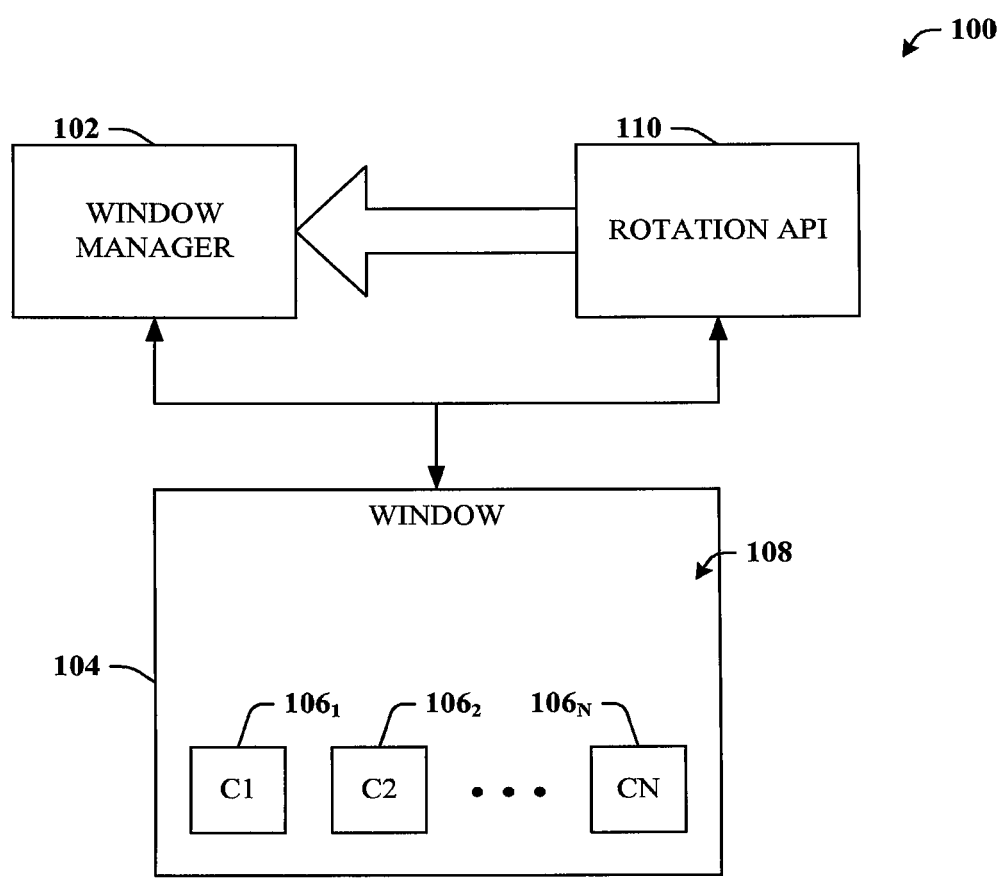
FIG. 1 is a block diagram of a computer-implemented system that can extend an operating system window manager with a rotation Application Programming Interface (API)

The subject matter of select embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "window", "desktop", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, a computer implemented system 100 that can extend an operating system window manager Application Programming Interface (API), is depicted. Generally, the system 100 can include an operating system window manager 102 configured to display a window 104. The window manager 102 can also display window contents $106_1$-$106_N$ for the window 104. The window contents $106_1$-$106_N$ can be referred to herein either collectively or individually as window content(s) 106 even though each of the window contents 106 can have unique characteristics that is distinguishing from other window contents 106. The window contents 106 can be, for example, directories, files, informational features, aesthetic features, links, utilities, etc. The window contents 106 are typically included within a primary surface 108 of the window 104, which is normally the total area encompassed by the window 104 and further detailed in connection with FIG. 2, infra.

The system 100 can also include a rotation API 110 that can extend the window manager 102. In accordance with one aspect of the claimed subject matter, the rotation API 110 can rotate the window 104 about 180 degrees to expose a secondary surface (not shown). For example, the window 104 can be a two-dimensional window displayed within the context of a desktop operating environment, wherein the window can be rotated about a y-axis (of course rotation about the x-axis is equally possible) to expose the "backside" or counter-side, which is referred to herein as the secondary surface. It is to be appreciated that the window 104 need not be limited only to windows, but can also include virtually any feature of a desktop user interface such as icons, menus, tabs (e.g., tabs or icons in a task bar or side bar, etc.), splash screens, etc., or even the entire desktop.

Irrespective of the particular embodiment, conventional windows (e.g., the conventional counterpart of window 104) are typically thought of as single-sided objects to display content. However, the claimed subject matter introduces the notion that certain user interface objects (e.g., window 104) can have a secondary surface (e.g., one or more additional surfaces) that can be exposed under certain circumstances in order to reveal alternative content that can differ from the window content 106. Hence, the claimed subject matter can be thought of as constructing double-sided (or multi-sided) objects out of traditional single-sided windows or other graphical objects in a manner that can be applied beyond the context of a single application. It is also to be appreciated that the rotation API 110 and/or the window manager 102 can output an audio object such as a "swoosh" sound in connection with rotating the window 104 to reveal the secondary surface or alternative content (both of which are further detailed with reference to FIG. 3).

Figure 2:
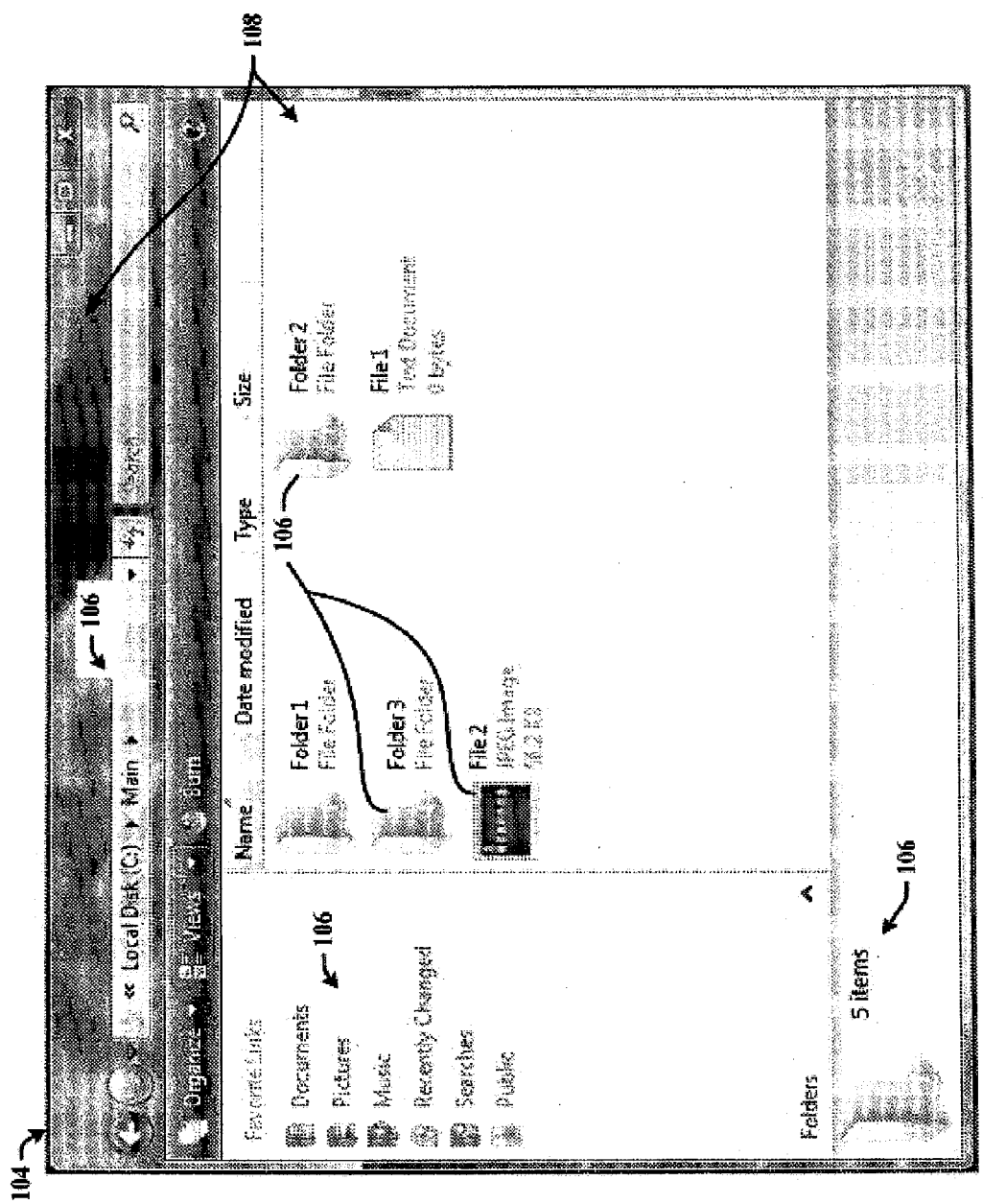
FIG. 2 illustrates a graphical representation of an example potentially double-sided window.

With reference to FIG. 2, a graphical representation of an example window 104 can be found. It is to be appreciated that the illustrated window 104 is merely exemplary in nature, intended to provide one concrete example of a window 104, but is not intended to be limiting as other types of window 104 are contemplated (e.g., icons, menus, tabs, a desktop, . . . ) and considered to be within the scope of the appended claims. As depicted, the window can include a variety of window content 106 such as files and folders, links, reference information, etc., as well as aesthetic characteristics. The window content 106 can include virtually any feature included within the primary surface 108 and is typically managed by a window manager (e.g., window manager 102 from FIG. 1).

It can be appreciated that while the window 104 is intended to be a virtual object, for example, existing within a desktop environment for a given computer operating system, if the window 104 existed as a physical object such as a piece of paper, then an observer could turn or flip the paper over to reveal an entirely different surface, potentially comprising additional content. By proxy, extending this notion to a virtual domain, the window 104 can be rotated to expose a secondary surface, as described more thoroughly infra with reference to FIG. 3.

Figure 3:
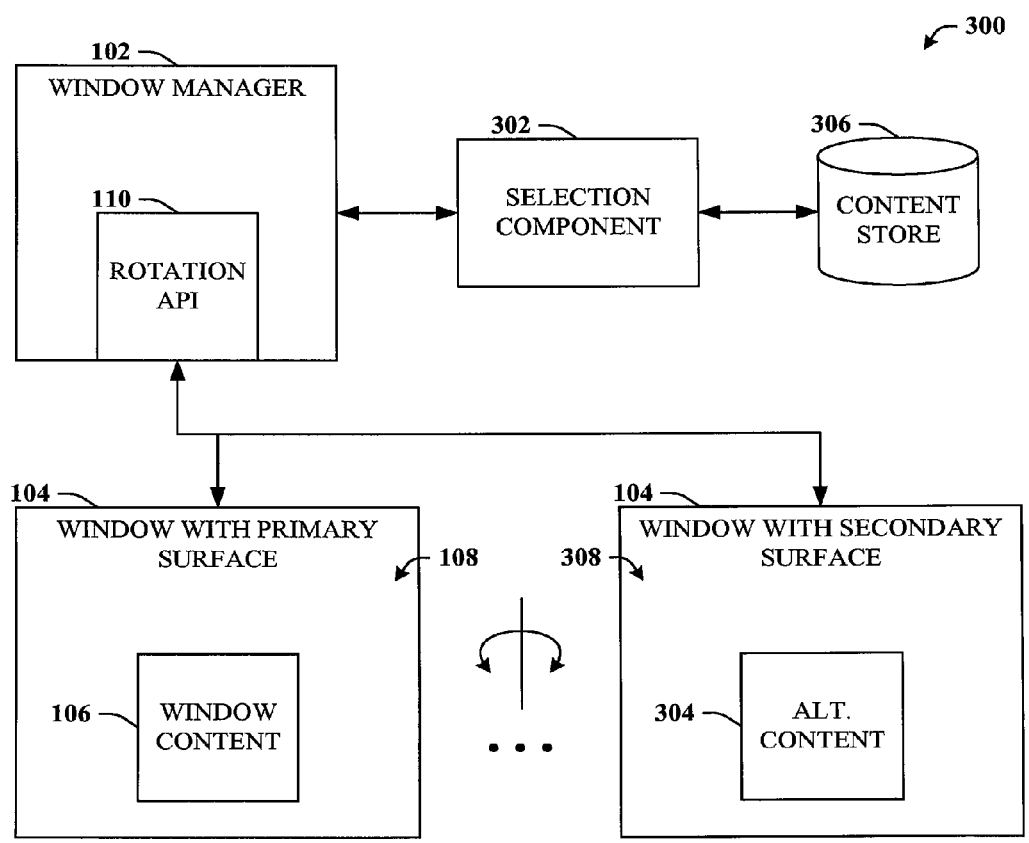
FIG. 3 depicts a block diagram a computer-implemented system with an extended window manager and a selection component.

Turning now to FIG. 3, a computer-implemented system 300 with an extended window manager and a selection component is illustrated. The system 300 can include the window manager 102 that can display a window 104 and associated window content 106 on the primary surface 108 of the window 104. In addition, the window manager 102 can include the rotation API 110 that can rotate the window 104 to expose a secondary surface 308, as substantially described supra. The system 300 can also include a selection component 302 that can select alternative content 304 for the window 104. For example, the selection component 302 can select alternative content 304 for display on the secondary surface 308. The selection component 302 can select the alternative content 304 from a content store 306 that can, e.g., include all available and/or potential alternative content 306, and, as will be further detailed, infra, the alternative content can be displayed on the secondary surface 308 of the window 104 (e.g., after the window 104 has been rotated to expose the secondary surface 308).

Figure 4:
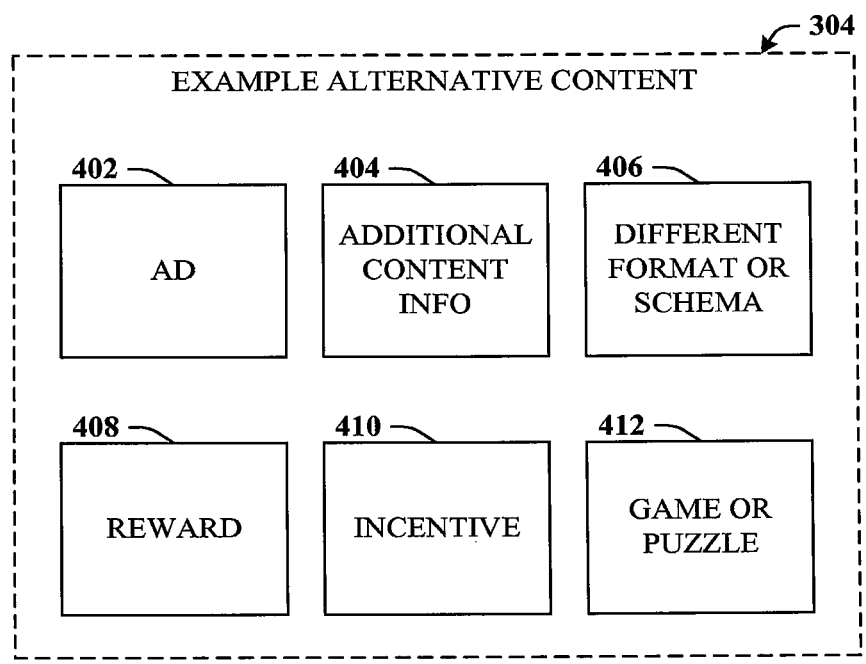
FIG. 4 illustrates a block diagram of a variety of examples of alternative content.

While still referencing FIG. 3, but referring briefly to FIG. 4, a variety of examples of alternative content are depicted. For example, the alternative content 304 can be an advertisement 402. The advertisement 402 can be for a particular product or service, or a more general trade or brand name advertisement. It is to be appreciated that the advertisement 402 can be either related or entirely unrelated to the window content 106 that is extant on the primary surface 108. As a second example, the alternative content 304 can be additional content information 404 such as detailed properties (e.g., location, date, history, update data, links, contextual data . . . ) relating to the window content 106 that are not displayed on the primary surface 108. For instance, if the window 104 is, say, an icon to launch an application, the secondary surface 208 can be programmatically assigned alternative content 304 in a similar manner as the application vendor programs the features of the icon on the primary surface 104.

Additionally or alternatively, the alternative content 304 can be a format or schema 406 from the window content 106. For example, if a user appreciates different visualizations for window content 106, a first preference can be set for the window content 106 on the primary surface (e.g., display window contents 106 in a tiled format) and a second preference can be set for the alternative content 304 extant on the secondary surface 308 (e.g., to display window contents 106 as a list). Accordingly, the user can quickly switch between visualizations of the window contents 106 by providing a convenient command (described infra) to rotate the window rather than manually setting and resetting the preferences each time a new view is desired.

Other forms of alternative content 304 can include a reward 408 or incentive 410. It is readily apparent that since alternative content 304 can be advertisements 402, associated advertisers will likely want to encourage users to view the alternative content 304 (e.g., by exposing the secondary surface 308) as well as to prevent "banner blindness". One or both of these objectives, as well as others, can be achieved by providing a potential for rewards 408 such as free prizes, redeemable points or the like, or incentives 410 such as coupons, interesting information, entertainment and so forth. Accordingly, alternative content 304 can also be a game 412 such as trivia, fun facts, a puzzle, etc. For example, the window 104 can be a dialog box the displays the progress of an installation or update of an application. A user could provide a command to rotate the dialog box to reveal a game 412 to occupy the time while the application installs. It should be understood that rewards 408, incentives 410 and/or games 412 need not be associated with advertisers. For example, an operating system provider (or application provider or window manager provider) could provide the rewards as a way of introducing features of the claimed subject matter to end users.

Still referring to FIG. 3, it should be appreciated and understood that the alternative content 304 (e.g., residing in the content store 306) can be dynamically updated by way of, for example, a wide area network such as the Internet by means of updater software or the like known in the art. Once the selection component 302 selects the appropriate alternative content 304, one of (depending upon the actual implementation) the window manager 102 or the rotation API 110 can adapt the alternative content 304 for display within the secondary surface 308 of window 104. In accordance therewith, the window manager 102 (or the rotation API 110) can rotate the window based upon an occurrence of an event, thus exposing the secondary surface 308 and exposing the alternative content 304. The text associated FIGS. 5-7 covers a number of the aforementioned aspects in greater detail and is indented to be read in connection with FIG. 3 as well.

Figure 5:
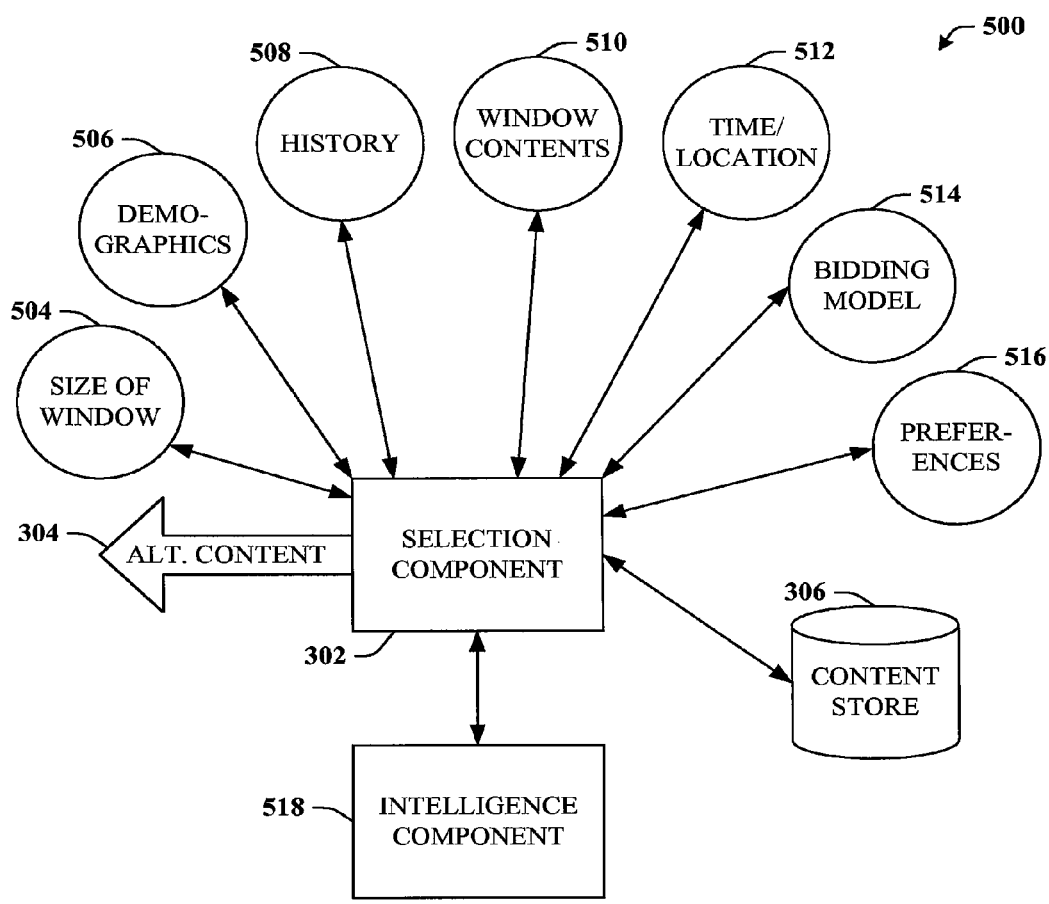
FIG. 5 is a block diagram of a computer-implemented system that selects alternative content.

Turning now to FIG. 5, a block diagram of a system 500 that selects alternative content is shown. In particular, system 500 illustrates a variety of means by which the selection component 302 can select the alternative content 304. In one aspect, the alternative content can be selected based upon a size or dimensions 504 of the window 104. For example, the selection component may select an advertisement from a particular advertiser but chose from several distinct advertisements from that advertiser based upon the size or dimensions 504 of the window 104. Continuing the example of an advertisement, the selection component 302 can select alternative content 304 based upon demographic information 506 related to a host computer or user of the computer. For instance, the selection component 302 can select an advertisement based upon passed purchases (e.g., online purchases), which can also be stored in the content store 306.

In addition, while demographics information is a common feature in the domain of ad targeting, the demographic information 506 can be privacy centric. For example, the content store 306 can potentially be populated by a wide variety of information about the user(s) of the host computer such as past purchases, but also other very rich information such as personal income, expenses, and other financial data (e.g., included in financial applications or the like). While the common procedure for ad targeting is to disclose personal information to a third party, which users are often loath to do, the selection component 302 can employ demographics information 506 to select the ad without sharing the demographics information 506 with the advertiser. Rather, such information can remain private. Accordingly, advertisers can provide ads, but the ad-targeting can be performed locally by a local and secure selection component 302.

In accordance with another aspect, the alternative content 304 can be selected based upon historical data 508 associated with a user such as a history of behavior or the like. For example, if the user generally immediately commands the secondary surface 308 to be reverted back to the primary surface 108, thereby providing a history of interaction that could suggest certain types of alternative content 304 are not of interest, the selection component 302 can, e.g., choose other types of alternative content 304. It is also to be appreciated that the alternative content 304 can be selected in conjunction with the window contents 510 (e.g., window content 106). For instance, the alternative content 304 can be selected based upon a relationship with the window content 104, 510 located on the primary surface. The window 104 can be, e.g., a display for a media player wherein the window content is the output of a Digital Versatile Disc (DVD) and the secondary surface 308 can include alternative content 304 that is, e.g., a commercial, deleted scenes, directory commentary or the like, all of which are related to the window content 104.

According to another aspect of the claimed subject matter, the selection component 302 can select the alternative content 304 based upon a time or location 512. As one example, different alternative content 304 can be selected based upon the time of the day (e.g., an ad for a breakfast muffin versus an ad for a dinner entrée), or, based upon a location (e.g., an ad for a local restaurant), which can be especially useful in the case in which the host computer is a mobile device such as a cell phone or handheld device. Additionally, the alternative content 514 can be selected based upon a bidding model 514. For instance, authors of alternative content 306 can place bids to purchase the display of that particular alternative content 306. While this is especially useful for ad-based alternative content 304, such need not be the case. The bidding model 514 can include bid price, the content author's reputation, the size of the secondary surface 308, as well as other criteria well-known in the ad-auction space or other bid-based domains. Finally, the selection component 302 can select the alternative content 304 based upon preferences, such as default preferences set by the provider of the window manager and/or preferences chosen by a user of the host computer.

While a number of examples have been illustrated, it is to be appreciated that the selection component 302 can also employ other means of selecting the alternative content 304. Hence, while the aspects described by reference numerals 504-516 provide concrete examples for context, these aspects are not intended to be limiting. Thus, the selection component 302 can employ any combination of the elements 504-516 as well as other criteria. Moreover, the system 500 can also include an intelligence component 518 that can be operatively coupled to or embedded within the selection component 302. Typically, the intelligence component 518 can aid in various determinations or inferences such as, in this case, aiding in selecting the alternative content 304 based upon various criteria such as one or more of the elements 504-516.

In particular, the intelligence component 518 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
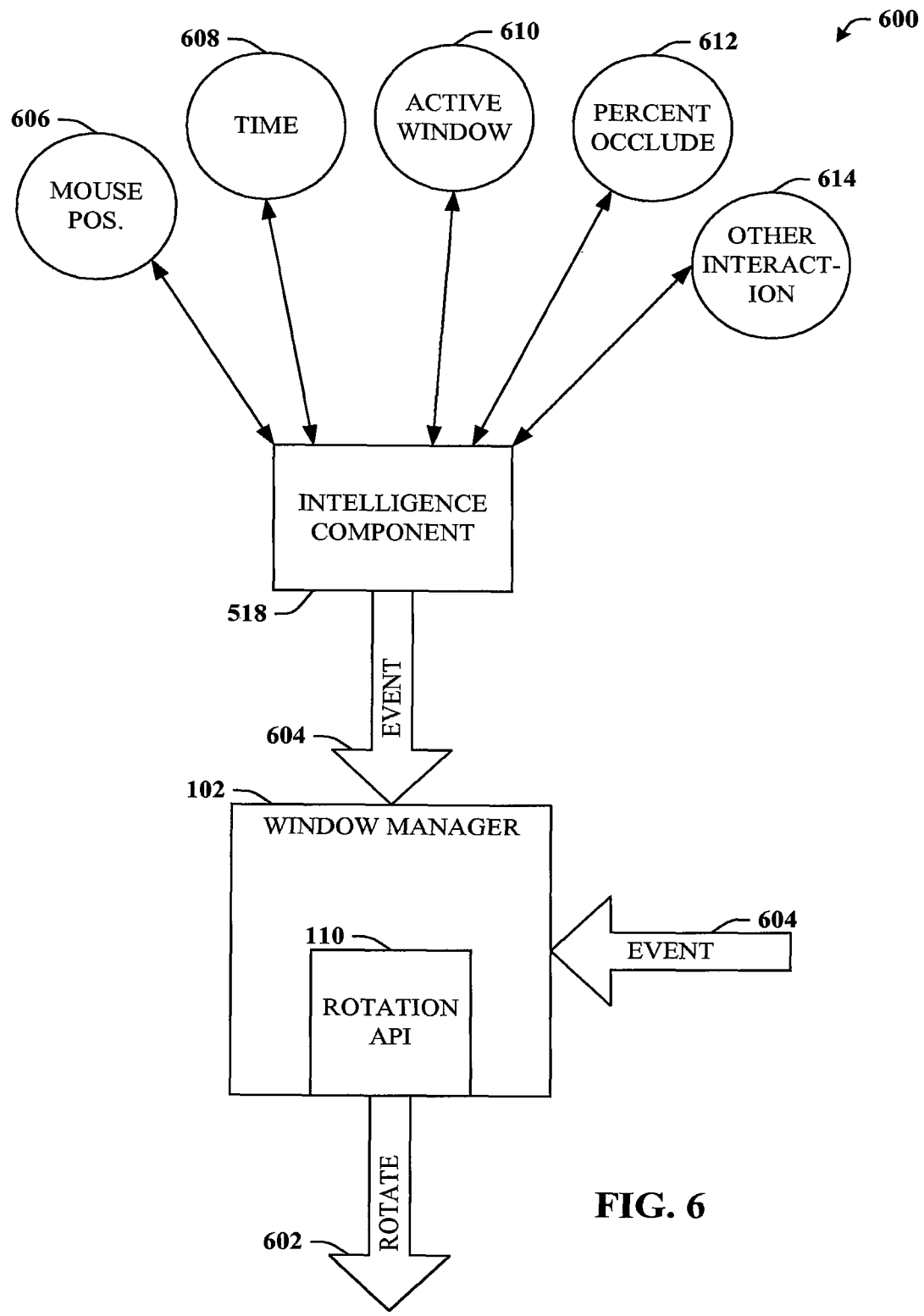
FIG. 6 illustrates a block diagram of a computer-implemented system that can rotate a window based upon an occurrence of an event.

With reference now to FIG. 6, a block diagram of a system 600 that can rotate a window based upon an occurrence of an event is illustrated. Generally, the system 600 can include the window manager 102 with the rotation API 110 as substantially described supra. For example, the window manager 102 and/or the rotation API 110 can supply a rotate command 602 in order to facilitate the rotation of window 104 to expose the secondary surface 308 as well as the alternative contents 304. The rotate command 602 can be generated based upon an event 604.

In accordance with one aspect of the claimed subject matter, the system can include an intelligence component 518 as substantially described supra in connection with FIG. 5 that is operatively connected to (or embedded within) at least one of the window manager 102 or the rotation API 110. The intelligence component 518 can provide for inferences in determining when to issue an event 604 signifying that the window 104 should be rotated to reveal the alternative content 304. The intelligence component 518 can examine a variety of data and/or data sets including, but not limited to, the elements 606-614, as will be described.

In particular, the intelligence component 518 can obtain a mouse (or other input device cursor) position 606 in order to determine whether an event 604 should be issued. For example, in some cases, a mouse position 606 included within the window 104 may be an indication that the window is currently in use and should not be rotated. On the other hand, such as when the window 104 is, say, an icon or another user interface object that is not likely to provide substantial I/O interaction, a mouse hover can be indicative of a desire to see the secondary surface, e.g., after the mouse has been over the window for a few moments without any other interaction. In addition, the intelligence component 518 can employ a quantum of time 608 in order to provide an inference. For instance, the event 604 can be generated once during an initial time period for the display of window 104, or the event could be generated periodically after a predetermined amount of time. In addition, the intelligence component 518 can employ time in order to infer how long to expose the secondary surface 308 as well as what actions or behavior on the part of a user will revert the window 104 back to the primary surface 108 and/or window content 106.

Similar to the notion of a mouse position 606, the intelligence component 518 can also rely upon a determination of the "active" window 610, or the window that is currently selected from which to send or receive information. For example, several windows 104 can be simultaneously visible to a user, but typically, only one window 104 is active at a given time. Hence, the intelligence component 518 can infer that the active window 104 should not be rotated but that the other non-active windows 104 can be. In contrast, potentially based upon other criteria the intelligence component 518 can infer that the active window 104 should be rotated as well.

It is to be appreciated that some windows 104 (e.g., non-active windows 104) may be partially or entirely occluded (e.g., percent occluded 612) by other windows 104 (most commonly by an active window, which is normally on top of other windows). In the case of an entirely occluded window, the intelligence component 518 can determine that no rotation event 604 need be generated since the alternative content 304 would be occluded as well. However, in some cases, the intelligence component 518 can signal that the occluded window 104 can be temporarily brought to the front such that the alternative content can be visible. In the case where the window 104 is partially occluded, the intelligence component 518 can also bring the window 104 to the front. Additionally or alternatively, the intelligence component 518 can create a pseudo-window (not shown) comprising the portions that are not occluded and allow the window manager 102 to adapt alternative content 304 for secondary surface 308 with the dimensions of the pseudo window and rotate only that portion of the window 104.

According to another aspect, the intelligence component 518 can also utilize other interaction 614 or behavior in order to ascertain whether or not to generate an event 604. For example, if the intelligence component 518 infers that a user of the host computer is engaged in work or another task-oriented endeavor, it can be inferred that an unsolicited event may not be appropriate. However, if the user is engaged in an event that is not task-oriented, then the event (even unsolicited) can be appropriate.

In accordance with another aspect of the claimed subject matter, the event 604 can be based upon a command issued by a user (e.g., directly solicited) of the host computer such as, e.g., a command from a mouse or other input device of the host computer. Such a case can be further detailed with reference to FIG. 7.

Figure 7:
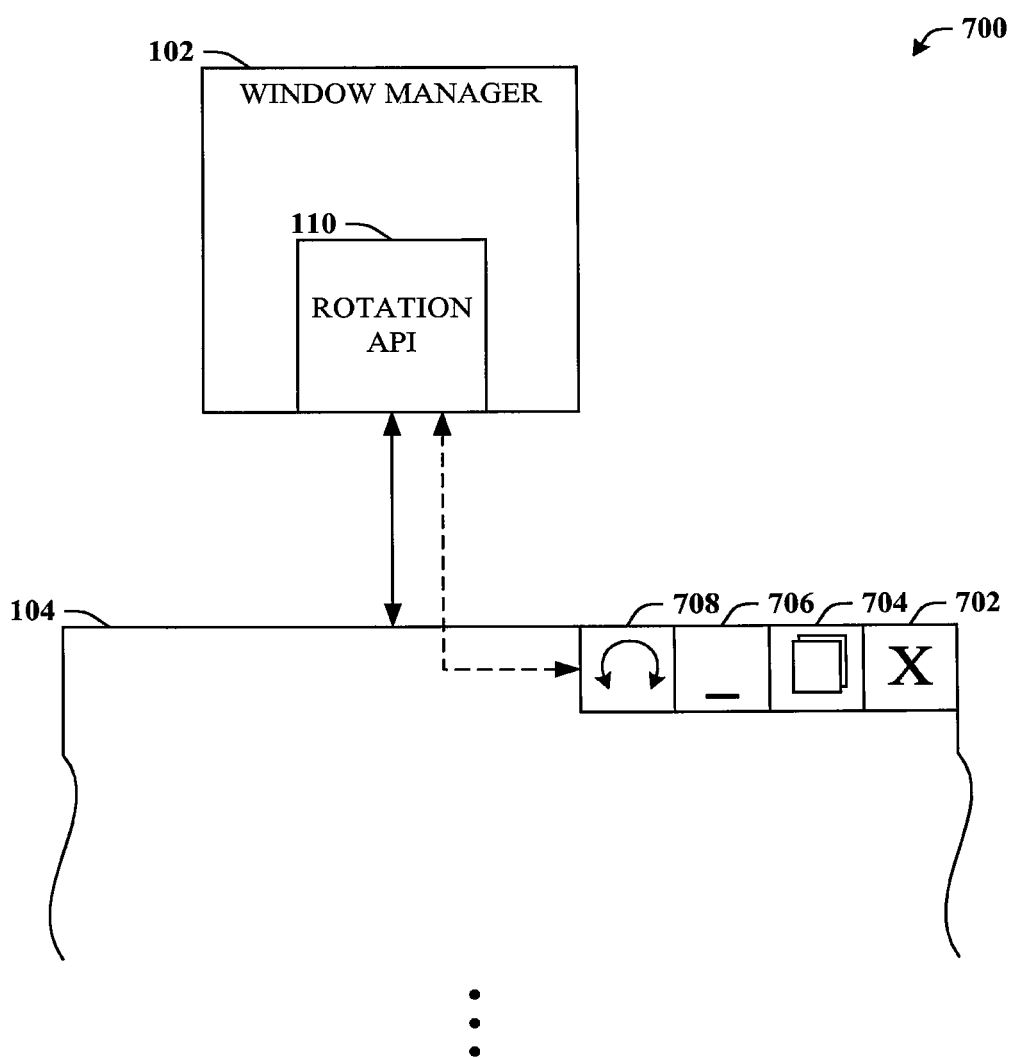
FIG. 7 is an example system that can display a window with embedded rotation features.

Turning now to FIG. 7, an example system 700 that can display a window with embedded rotation features is depicted. The system 700 can include the window manager 102 that can display a window 104. In addition, the system 700 can include the rotation API 110 that can rotate a window to expose a secondary surface and/or reveal alternative content included within the secondary surface. A common feature associated with conventional windows is a group of easily accessible commands to close, move, resize, maximize, restore, or minimize the window. Oftentimes, these commands can be referenced by clicking a convenient button, normally along the upper border of the window.

Reference numeral 702 shows an example close button to close (e.g., destroy) the window 104. Conventional systems generally remove the window when a user clicks on the close 702 button, although in many cases, a window manager will accompany this action with some sort of animation. Reference numeral 704 depicts a restore button that restore a window 104 that is maximized to a smaller size, generally with the position and dimensions the window 104 held before it was maximized. If the window 104 is not currently maximized, the min/max button 704 will typically maximize the window 104. In either case, it is common to accompany this action as well with some type of brief animation. Reference numeral 706 denotes an example minimize button, for which activation will generally remove the window 104 from the display, where the window 104 can be redisplayed by clicking a tab in, e.g., a task bar. As with the other buttons 702 and 704, activating the minimize button is generally accompanied by an animation such as the window shrinking down to the task bar or some other location where it can be later referenced.

In accordance with an aspect of the claimed subject matter, a command to close, minimize, maximize, or restore can serve as the event 604 from FIG. 6. For example, in addition to or in the alternative to some animation to signify that the window is closing, being minimized, etc., the window manager 102 can rotate the window 104 before closing, minimizing, etc. the window 104, thereby revealing alternative content in a non-invasive manner. Moreover, conventional windows generally allow a user to resize or reposition the window. Generally, a window can be resized by moving the mouse cursor near an edge of the window until the cursor changes shape to indicate a click-and-drag motion will resize the window. Similarly, the window is often repositioned by clicking on the upper bar and dragging the window to a new position. In both cases, there are standard features in many desktop environments to allow a user to select a preference to display the contents of the window while repositioning (or resizing) or to make the contents transparent during that procedure. The claimed subject matter provides for displaying alternative contents during the aforementioned procedures.

In addition, the rotation API 110 can instruct the window manager 102 to display a rotate button 708. The rotate button 708 can be inserted in any appropriate window (which can be based upon a common scheme and/or inferred, e.g., by the intelligence component 518). The rotate button can serve as a manual command to generate the event 604. For example, given that the alternative content can be very useful, informative, and/or entertaining; the rotate button 708 can allow convenient access to the alternative content in a manner employed by conventional buttons 702-706. While the rotate button 708 provides one example, it is to be appreciated that other means can be provided to allow a user to reveal the alternative content. For example, the rotate feature can be mapped to a mouse button (e.g., a side or "back" button), placed in an action bar menu, placed in a context-menu (e.g., accessed by a right-click on the window), or substantially any other means.

Figure 8:
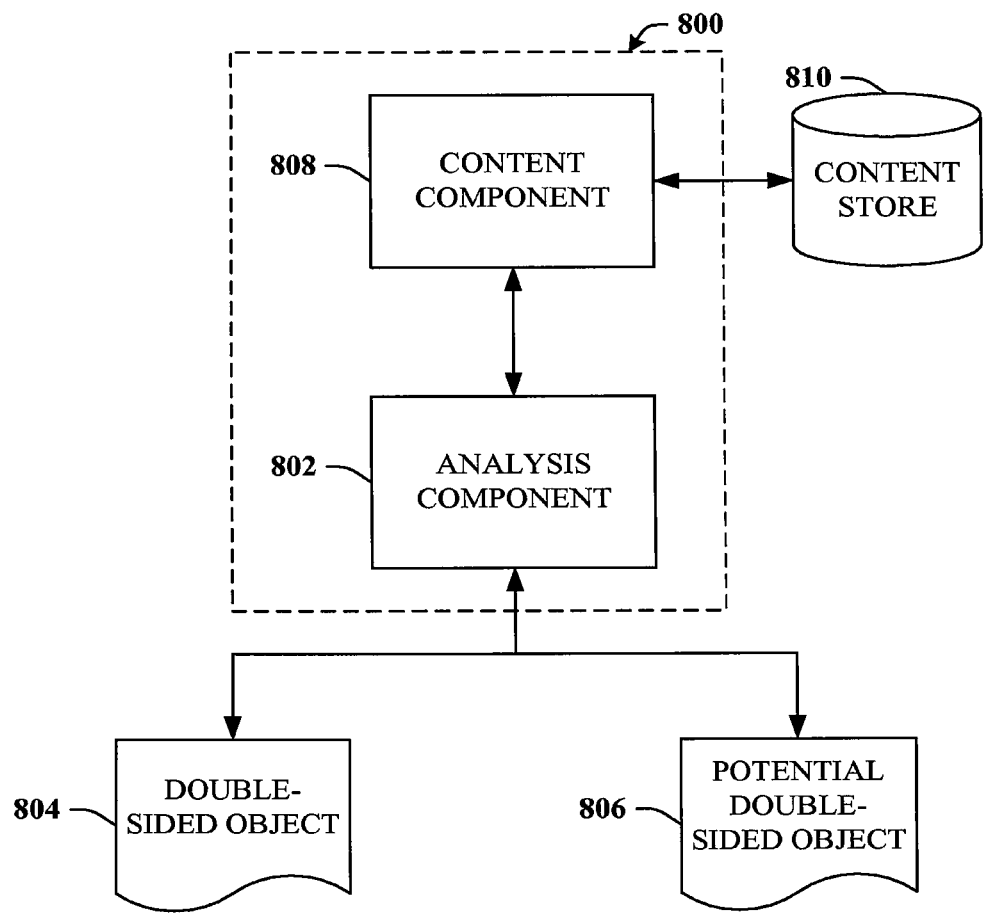
FIG. 8 depicts a computer-implemented system that can facilitate display of alternative content.

Referring to FIG. 8, a computer-implemented system 800 that can facilitate display of alternative content is depicted. Although not shown, the system 800 can interface with the window manager 102 (and/or rotation API 110) of FIGS. 1 and 3, for example, as well as a content store 810 that can be substantially similar to the content store 306. Generally, the system 800 can include an analysis component 802 that can identify a computer-based graphical object that is a double-sided object 804 or a potentially double-sided object 806. As used herein, a double-sided object 804 can be a graphical object that is employed as a double-sided item. One example of a double-sided object 804 is a graphical representation of a playing card associated with a computer-based card game, which will be further discussed in connection with FIG. 9. However, it is to be appreciated that other embodiments of double-sided objects 804 can exist and are to be considered within the scope and spirit of the appended claims. In contrast, a potentially double-sided object 806 is used herein to refer to a graphical object that is implemented as a single-sided object, and thus, a secondary side potentially exists. Examples of potentially double-sided object 806 can include FIG. 2, as well as the description associated with FIG. 1 such as icons, menus, tabs, splash screens, or even the entire desktop.

In addition, the system 800 can include a content component 808 that can select alternative content to be displayed on a secondary side of the graphical object. The content component 808 can select the appropriate alternative content in a manner substantially similar to that described in connection with the selection component 302 (from FIG. 3). Hence, as with the selection component 302, the content component 808 can employ inferences (and/or be operatively associated with the intelligence component 518) in order to facilitate selection of the alternative content, which, as well, can be housed in a content store 810 substantially similar to the content store 306.

Figure 9:
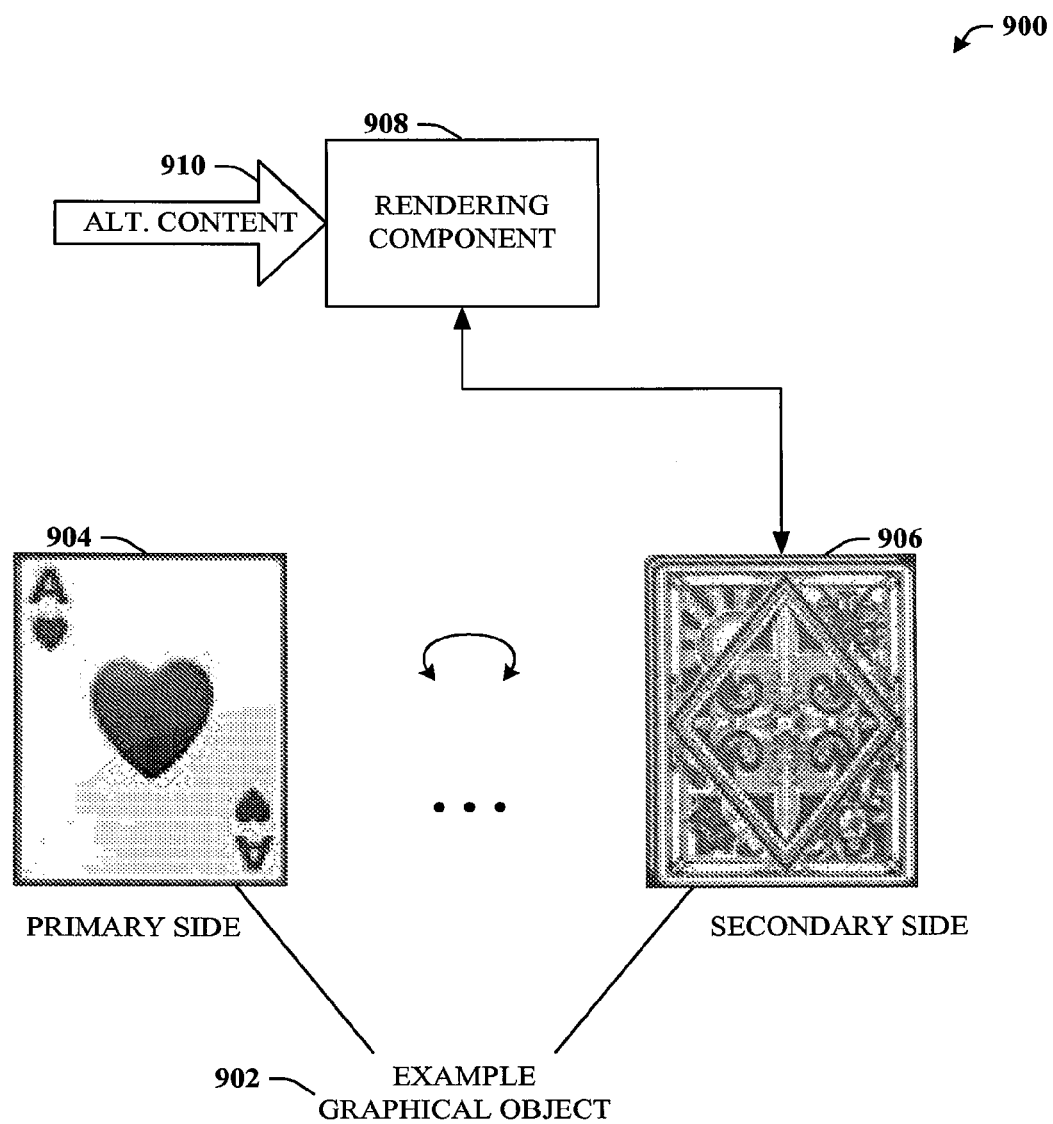
FIG. 9 illustrates a computer-implemented system for displaying alternative content.

While still referring to FIG. 8, but turning also to FIG. 9, a computer-implemented system 900 for displaying alternative content is illustrated. The system 900 can include a graphical object 902, which can be either a double-sided object 804 or a potentially double-sided object 806. In the instant figure, the graphical object 902 is a double-sided object 804, since the object is already implemented with two sides, a primary side 904 (e.g., the "important" side) with unique characteristics or properties, and the secondary side 906 which includes a card pattern for content and is not of vital importance. It is to be appreciated that the analysis component 802 can infer and/or make a determination as to which side of the graphical object 902 is the primary side 904 and which side is the secondary side 906. Once the secondary side is determined (for the case in which the graphical object 902 is a potentially double-sided object 806, this determination is trivial), a rendering component 908 can display the alternative content 910 (e.g., supplied by the content component 808) on the secondary side 906 of the graphical object 902.

It is to be appreciated that in the case of a double-sided object 804 (as is the case in FIG. 9), the original content (e.g., the deck pattern/design) can be overwritten with the alternative content. It is to be further appreciated that the rendering component 908 can overwrite the original content in a manner that is independent from the application or API that instantiated the graphical object 902. Thus, while claimed subject matter can function at an operating system window manager level to provide additional content 910 rather than at the application level.

Figure 10:
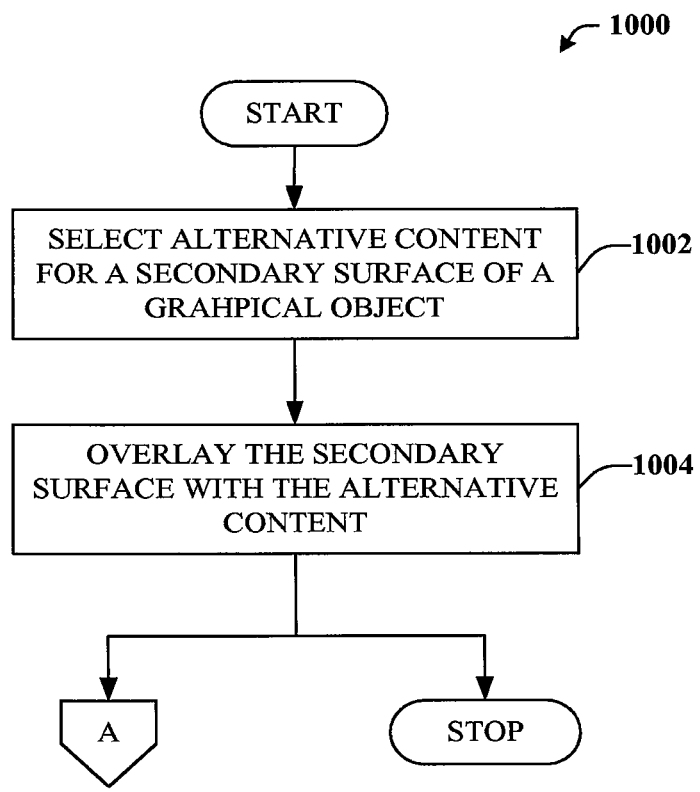
FIG. 10 is an exemplary flow chart of procedures that define a computer implemented method for extending an operating system window manager API.
Figure 11:
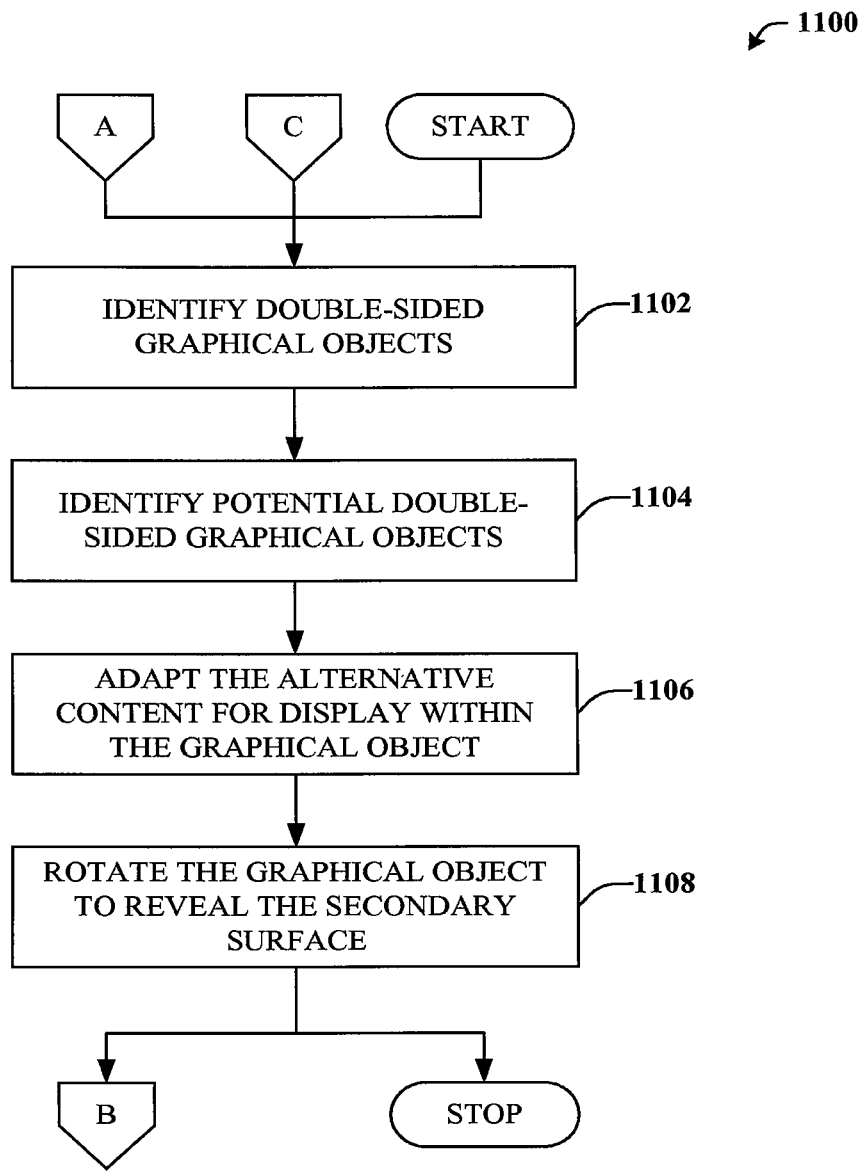
FIG. 11 is an exemplary flow chart of procedures for a computer implemented method with additional features for extending an operating system window manager API.
Figure 12:
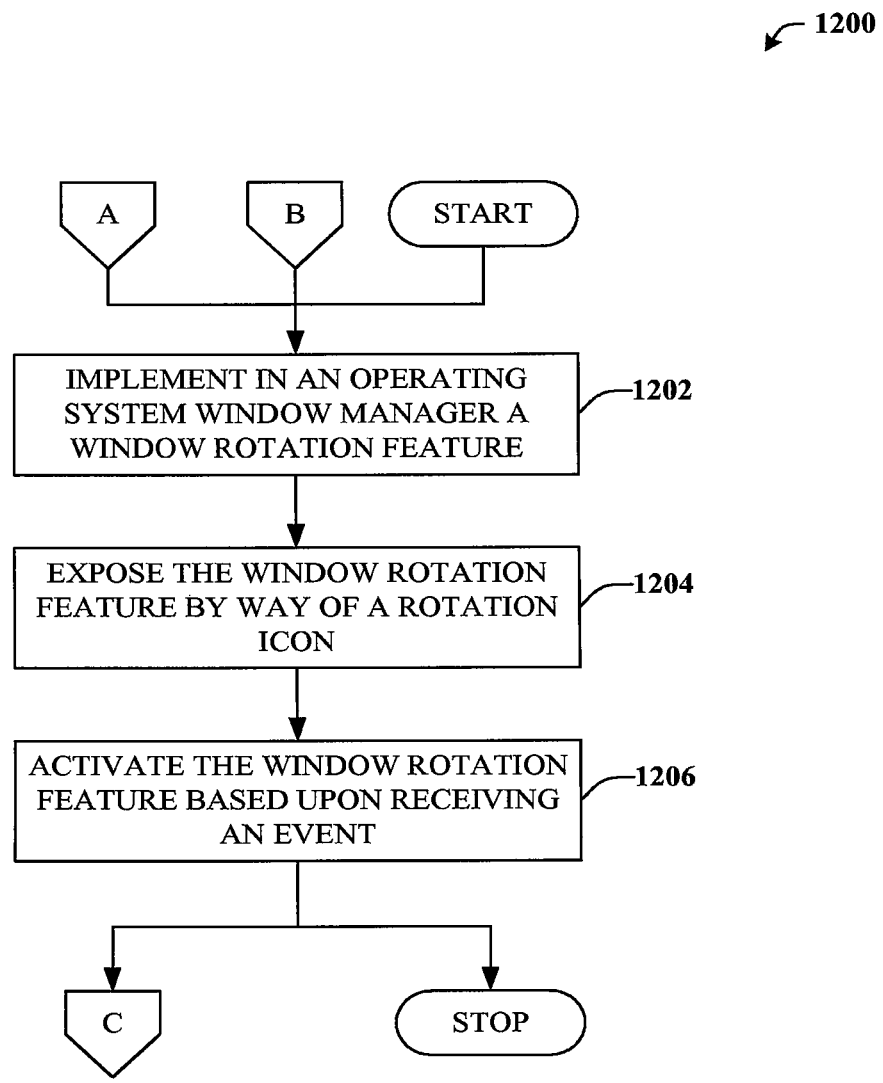
FIG. 12 depicts an exemplary flow chart of procedures defining a computer implemented method with additional features for extending an operating system window manager API.

FIGS. 10, 11, and 12 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device.

Turning now to FIG. 10, an exemplary computer implemented method 1000 for extending an operating system window manager API is illustrated. In general, at reference numeral 1002, alternative content to be displayed on a secondary surface of a graphical object can be selected. It should be understood that the alternative content can be selected from a very broad data set that can include, e.g., advertisements, additional content information associated with the original window content, different visualizations for the original content, rewards, incentives, trivia, games, puzzles and so on. In addition, the alternative content can be selected based upon numerous criteria, including but not limited to a size or dimensions of the window, demographic information associated with a user or machine, a history of interaction, a relationship with the original window content, a time or location, a bidding model, designated preferences, or the like. Accordingly, the broad data set and/or the numerous criteria can be included in a content store.

In addition, at reference numeral 1004, the secondary surface can be overlaid with the alternative content. In accordance therewith, when the secondary surface is exposed, alternative content can be revealed.

With reference now FIG. 11, an exemplary computer implemented method 1100 with additional features for extending an operating system window manager API is depicted. Generally, at reference numeral 1102, a double-sided graphical object can be identified. For example, a double-sided graphical object can be a graphical object specifically implemented to include two sides, such as a representation of a playing card associated with a computer-based game. At reference numeral 1104, potential double-sided graphical objects can be identified. For instance, graphical object that are implemented as single-sided objects can be in many cases potential double-sided graphical objects.

At reference numeral 1106, the alternative content (e.g., selected based upon act 1002 of FIG. 10) can be adapted for display within the secondary surface of the graphical object, or, in some cases, selected portions of the secondary surface (e.g., when some percentage of the window including the primary/secondary surfaces is occluded). It is to be appreciated that a window manager can perform the act of adapting in some instances, while in others, an extension to the windows manager in the form of a rotation API can perform the act of adapting. At reference numeral 1108, the graphical object can be rotated about an axis (e.g., an x- or y-axis) to expose the secondary surface, and, thus, revealing the alternative content.

Turning briefly to FIG. 12, an exemplary computer implemented method 1200 with additional features for extending an operating system window manager API is depicted. At reference numeral 1202, a window rotation feature can be implemented in an operating system window manager. For example, the window manager can be extended with a rotation API that can rotate a window about an axis to expose a new surface (e.g., the secondary surface), that can include distinct content (e.g., alternative content). At reference numeral 1204, the window rotation feature can be exposed as a rotation icon or button. The rotation button can exist by itself, or can be in addition to other function buttons such as buttons to close, minimize, restore or maximize the underlying window.

At reference numeral 1206, the window rotation feature can be activated based upon receiving an event. In accordance with one aspect of the claimed subject matter, the event is at least one of a command or an inference. In the case of the former, the command can be in the form of a click on or input to the rotation button described supra as well as a input to another function button (e.g., the minimize, maximize, or close buttons), as well as input to an action menu or context menu. In the case of the latter, where the event is based upon an inference, the inference can be constructed based upon a variety of factors, such as those inferences described in connection with the intelligence component above.

Figure 13:
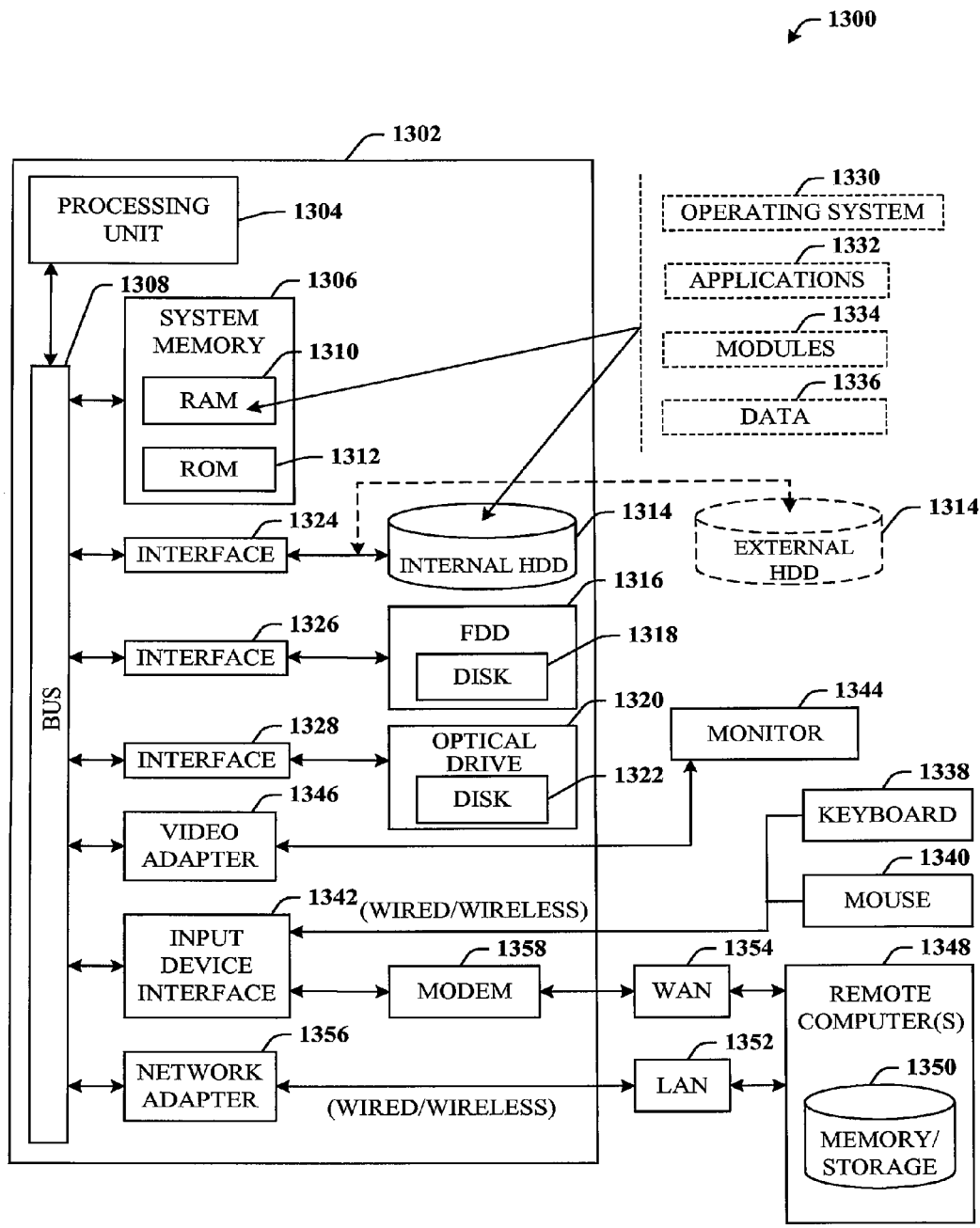
FIG. 13 illustrates a block diagram of a computer operable to execute the disclosed architecture.

Referring now to FIG. 13, there is illustrated a block diagram of an exemplary computer system operable to execute the disclosed architecture. In order to provide additional context for various aspects of the claimed subject matter, FIG. 13 and the following discussion are intended to provide a brief, general description of a suitable computing environment 1300 in which the various aspects of the claimed subject matter can be implemented. Additionally, while the claimed subject matter described above can be implemented in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media comprise computer storage media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other device which can be used to store the desired information and which can be accessed by the computer.

Computer-readable media, as used herein, is understood to be exclusive of communications media. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

With reference again to FIG. 13, the exemplary environment 1300 for implementing various aspects of the claimed subject matter includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a nonvolatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE1394 interface technologies. Other external drive connection technologies are within contemplation of the claimed subject matter.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the claimed subject matter can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 13 BaseT wired Ethernet networks used in many offices.

Figure 14:
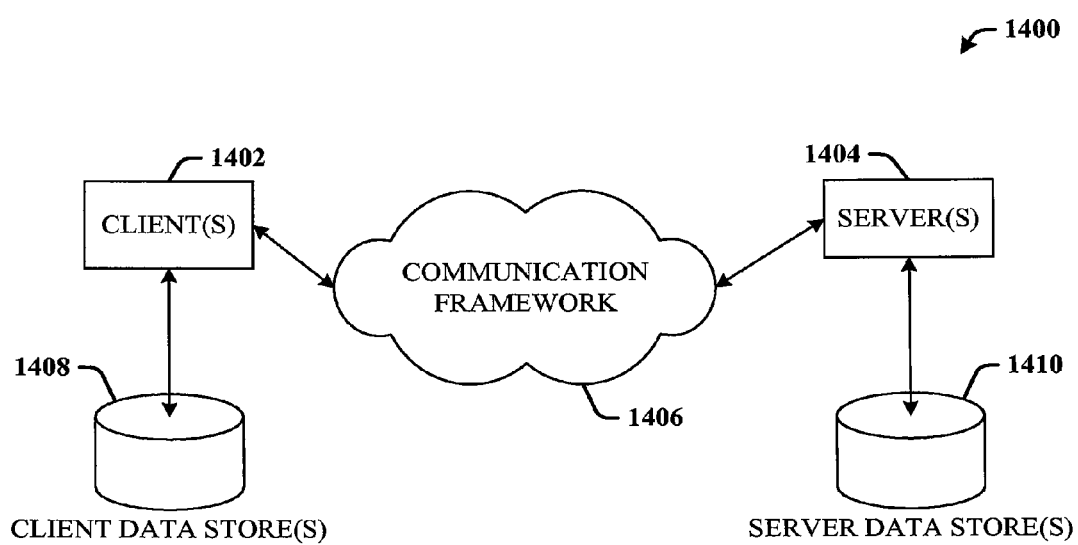
FIG. 14 illustrates a schematic block diagram of an exemplary computing environment.

Referring now to FIG. 14, there is illustrated a schematic block diagram of an exemplary computer compilation system operable to execute the disclosed architecture. The system 1400 includes one or more client(s) 1402. The client(s) 1402 can be hardware and/or software (e.g., threads, processes, computing devices). The client(s) 1402 can house cookie(s) and/or associated contextual information by employing the claimed subject matter, for example.

The system 1400 also includes one or more server(s) 1404. The server(s) 1404 can also be hardware and/or software (e.g., threads, processes, computing devices). The servers 1404 can house threads to perform transformations by employing the claimed subject matter, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented method for extending an operating system window manager Application Programming Interface (API), comprising:
   implementing, in an operating system window manager executing on a computing device having a processor, an Application Program Interface (API) that enables a rotation feature that is useable by the window manager to rotate a graphical object independent of an application that instantiated the graphical object;
   displaying, by the window manager, a primary surface of a graphical object and contents associated with and included within the primary surface of the graphical object, a secondary surface of the graphical object being entirely occluded by the primary surface, the graphical object comprising one or more of an icon, a menu, a tab, a splash screen, a desktop display, a window, a task bar, a side bar, and a component in a task bar or side bar; and
   rotating, by the window manager using the rotation API, the graphical object to expose the secondary surface of the graphical object.

2. The method of claim 1, further comprising:
   selecting alternative content for the graphical object, wherein at least one of the window manager or the rotation API adapts the alternative content for display within the secondary surface of the graphical object.

3. The method of claim 2, wherein the alternative content is an advertisement that is associated with the content of the graphical object or that is not associated with the content of the graphical object.

4. The method of claim 3, wherein the selection component uses private user data to select the advertisement based on targeted advertisement.

5. The method of claim 4, wherein the private user data includes one or more of financial, demographic, historical, and activity data of a user.

6. The method of claim 4, wherein the private user data is stored locally on the computing device and is not shared with an advertiser or other third party.

7. The method of claim 4, wherein, the selection of the advertisement is performed locally on the computing device without communicating with a third party.

8. The method of claim 2, further comprising:
   identifying a portion of the graphical object that is not occluded by a second graphical object, the portion being rotatable by the rotation API separately from the remainder of the graphical object to expose the secondary surface associated with the portion.

9. The method of claim 8, wherein selecting alternative content comprises selecting alternative content for the portion of the graphical object.

10. The method of claim 1, wherein the graphical object is at least partially occluded by an active graphical object, and rotating the graphical object brings the graphical object to the front to display the secondary surface un-occluded by the active graphical object.

11. A computer-implemented method that facilitates display of alternative content, comprising:
    implementing, in an operating system window manager executing on a computing device having a processor, an Application Program Interface (API) that enables a rotation feature that is useable by the window manager to rotate a graphical object independent of an application that instantiated the graphical object;
    determining, by the operating system, a computer-based graphical object that is double-sided or potentially double-sided;
    identifying a portion of the graphical object that is not occluded by a second graphical object;
    selecting alternative content to be displayed on a secondary side of only the portion of the graphical object based at least in part on dimensions of the portion of the graphical object;
    rotating, by the window manager using the rotation API, at least the portion of the graphical object to expose the secondary side of the portion of the graphical object; and
    displaying the selected alternative content on the secondary side of the portion of the graphical object.

12. The method of claim 11, wherein the graphical object comprises one or more of an icon, a menu, a tab, a splash screen, a desktop display, a window, a task bar, a side bar, and a component in a task bar or side bar.

13. The method of claim 12, wherein the portion of the graphical object comprises a pseudo-window.

14. The method of claim 11, wherein only the portion of the graphical object is rotated to display the alternative content on the secondary side of the portion of the graphical object.

15. A computer-implemented method for extending an operating system window manager API, comprising:
    implementing in an operating system window manager executing on a computing device having a processor, an Application Program Interface (API) that enables a window rotation feature that is useable by the window manager to rotate a graphical object independent of an application that instantiated the graphical object;
    displaying a plurality of graphical objects, the graphical objects comprising one or more double-sided graphical objects, multi-sided graphical object, or single-sided graphical objects that can be configured to be a double-sided or multi-sided graphical objects;

identifying a graphical object that is an active graphical object;

rotating, by the window manager using the API, the graphical objects different from the active graphical object to expose secondary surfaces of the rotated graphical objects.

16. The method of claim 15, wherein the active graphical object is identified based on a position of an input device cursor.

17. The method of claim 16, wherein the input device corresponds to a touch screen.

18. The method of claim 15, further comprising rotating the active graphical object.

19. The method of claim 15, wherein the graphical object is at least partially occluded by an active graphical object, and rotating the graphical object brings the graphical object to the front to display the secondary surface un-occluded by the active graphical object.

* * * * *